J. B. SNYDER.
CANT HOOK.
APPLICATION FILED JULY 30, 1909.
940,207.
Patented Nov. 16, 1909.
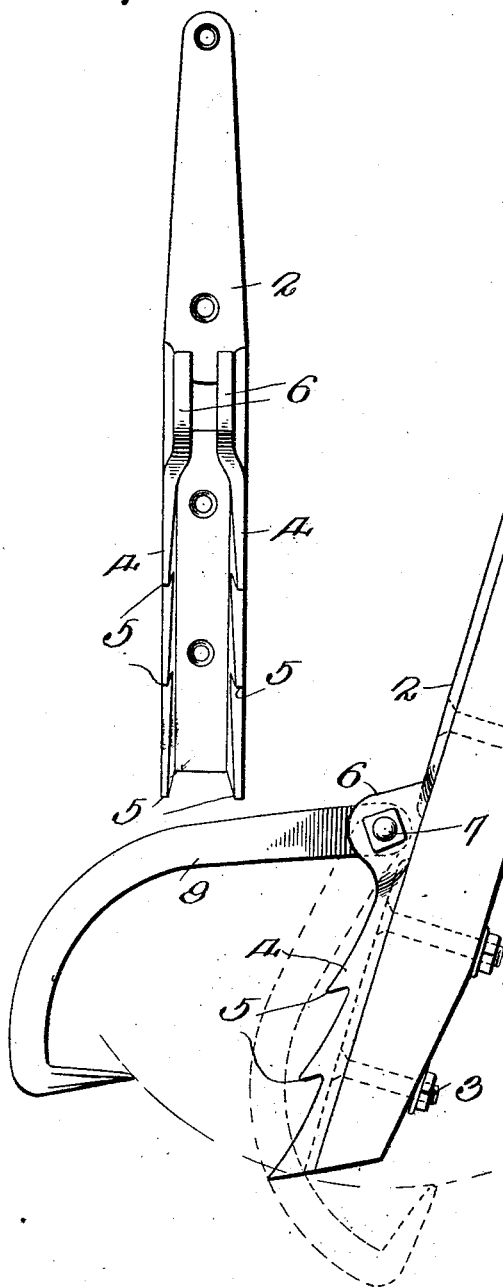
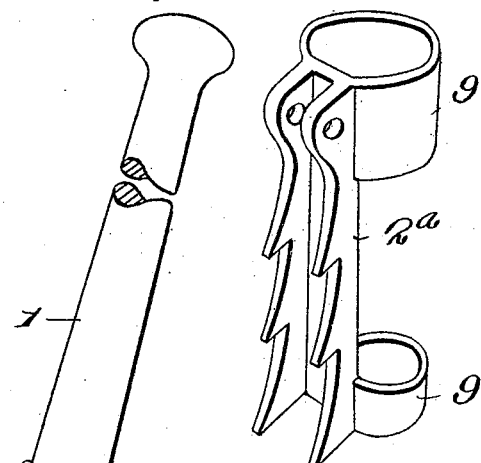
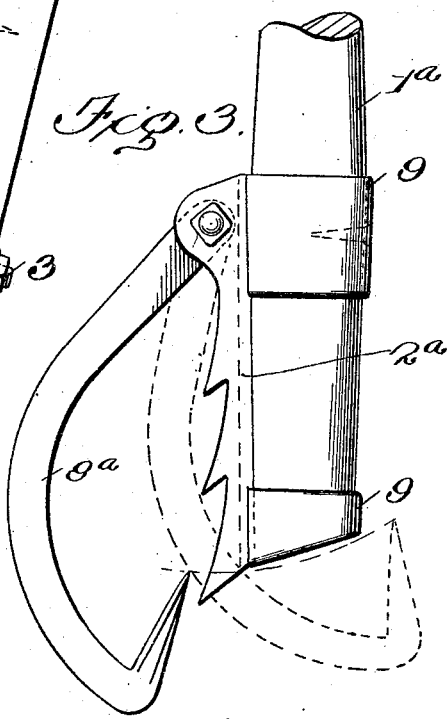
Witnesses
W. T. Woodson
Juana M. Fallin
Inventor
J. B. Snyder
By R. H. & A. K. Lacey, Attorneys

UNITED STATES PATENT OFFICE.

JESSE B. SNYDER, OF PLUM RUN, PENNSYLVANIA.

CANT-HOOK.

940,207.  Specification of Letters Patent.  Patented Nov. 16, 1909.

Application filed July 30, 1909. Serial No. 510,492.

*To all whom it may concern:*

Be it known that I, JESSE B. SNYDER, citizen of the United States, residing at Plum Run, in the county of Fulton and State of Pennsylvania, have invented certain new and useful Improvements in Cant-Hooks, of which the following is a specification.

This invention comprehends certain new and useful improvements in devices for handling logs, timbers and the like, and the invention has for its primary object a cant hook which will readily adapt itself to a log or timber of any size and which will also be so constructed that it can be used as a peavey.

With these and other objects in view as will more fully appear as the description proceeds, the invention consists in certain constructions and arrangements of the parts that I shall hereinafter fully describe and claim.

For a full understanding of the invention, reference is to be had to the following description and accompanying drawings in which:

Figure 1 is a side elevation of one form or embodiment of my improved cant hook; Fig. 2 is a face view of the base plate thereof; Fig. 3 is a side elevation of a portion of a modification, and, Fig. 4 is a detail perspective view of the base plate employed in such modification.

Corresponding and like parts are referred to in the following description and indicated in all the views of the accompanying drawings by the same reference characters.

Referring to the drawing, and now particularly to Figs. 1, and 2, the numeral 1 designates the handle of my improved cant hook, the same being of any desired size, and 2 designates a plate which extends longitudinally along one edge of the handle at one end thereof and which is secured thereto as by bolts 3. The plate 2 is formed along its side edges for a portion of its length with outwardly turned flanges 4, the flanges extending parallel with each other as shown and being formed in their outer edges with teeth 5. Preferably the teeth make an angle of about 60° with the base portion of the plate 2, the teeth of one flange being in transverse alinement with the teeth of the other flange. The points of the teeth 5 are set forward sufficiently to take hold of the timber as soon as the handle is lifted, thereby taking the strain off the hook of the device. The teeth are set a sufficient distance apart to allow the timber to drop down between the teeth so as to obtain a firm hold. The flanges 4 terminate at one end in laterally spaced ears 6 that are formed with apertures through which a pivot bolt 7 extends. 8 designates the hook proper, which is of the customary curved form and which is secured at one end between the ears 6 by the bolts 7. It is to be particularly noted that the distance between the pivotal point of the hook and the point at the pointed end thereof is substantially the same as the length of the plate from the lower or outer end thereof to the pivotal point of the hook, the hook thus swinging around and barely clearing the end of the plate.

Referring particularly to Fig. 3, it will be understood that my invention is not limited to any means for securing the plate to the handle; for instance as illustrated in Fig. 3, 1$^a$ designates the handle, 2$^a$ the plate and 8$^a$ the hook proper, the plate being secured upon the handle by thimbles or bands 9. In this embodiment of the invention, the hook is usually larger, and the handle is also slightly heavier, in order to enable one to handle heavier and larger timber.

From the foregoing description in connection with the accompanying drawings, it will be seen that the teeth at the lower end of the plate project downward from the plate and pass on each side of the hook as the hook is swung down. It will therefore be apparent that the teeth on the lower end of the plate may serve as a peavey in the lifting and handling of timber, or said teeth may be forced into the timber to form a purchase for the hook when it is inconvenient or impossible on account of the position of the lumber to engage the same between the inner teeth and the hook.

It will be understood that in handling squared lumber the edge of the lumber is engaged in the recess under one of the pairs of teeth, said teeth bearing on the top thereof while the hook end forces its way into and engages the side of the timber, while in the handling of round or un-hewn lumber or timber the teeth force their points into the same and prevent the device from slipping. It will be observed by those familiar with the use of devices of this character that the angle and size of the teeth of this device and the shape of the hook enable the user thereof to handle larger lumber than is possible with the hooks now in use, while at the same time the arrangement of the projecting teeth at the end of the plate enable the user to handle extremely small sticks and timber such as hooks now used for the handling of large timber will not grasp, and that thus I provide a hook which will grasp and handle both larger and smaller timber than the hooks at present in use.

It will further be observed that my hook is particularly adapted for use in lifting or dragging timber, as the teeth on the flanges being a distance apart serve to prevent the lumber engaged by the end therebetween from turning or rolling thereon but as a part of the log rests in the groove between the flanges it is to an extent balanced therein and thus is a great deal easier to handle, while in dragging the log, the projecting teeth are of sufficient length to engage in the log if desired but not long enough to interfere with the ground and strike the same or to prevent the ready engagement of the point of the hook in the log. This arrangement of the end teeth is also of great convenience in turning over timber lying on the ground as it is possible to engage and turn a small piece of timber without the end of the handle or plate being interfered with by contact with the ground.

Having thus described the invention what I claim is:—

1. In a cant hook, the combination with the handle, of a plate suitably secured thereon, said plate having its edges bent upward to form flanges, teeth formed on the flanges, said flanges terminating at their upper ends in a pair of ears, a hook pivotally secured between said ears, said hook being so constructed that the point thereof will just clear the lower end of the plate as it is swung inward, the lower teeth on the plate projecting therefrom and forming a groove through which the point of the hook passes.

2. In a cant hook, the combination with a handle, of a plate formed with upwardly projecting flanges secured thereon, teeth formed on said flanges, the lower teeth on the flanges projecting below the lower end of the plate and at an angle of 60 degrees therewith, and a hook pivotally secured between the flanges and adapted to swing free of the end of the plate but between said teeth, said teeth being adapted for use as a peavey.

In testimony whereof I affix my signature in presence of two witnesses.

JESSE B. SNYDER. [L. S.]

Witnesses:
 JONATHAN C. SNYDER,
 A. A. SWINGLE.